(12) United States Patent
Kilmurray et al.

(10) Patent No.: US 10,239,531 B2
(45) Date of Patent: Mar. 26, 2019

(54) FAULT-TOLERANT AUTOMOTIVE BRAKING SYSTEM

(71) Applicant: GM GLOBAL TECHNOLOGY OPERATIONS LLC, Detroit, MI (US)

(72) Inventors: Paul A. Kilmurray, Wixom, MI (US); Alan J. Houtman, Milford, MI (US); Christopher C. Chappell, Commerce Township, MI (US); Brandon C. Pennala, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/402,673

(22) Filed: Jan. 10, 2017

(65) Prior Publication Data

US 2018/0194353 A1 Jul. 12, 2018

(51) Int. Cl.
*B60W 30/18* (2012.01)
*B60T 7/04* (2006.01)
(Continued)

(52) U.S. Cl.
CPC ....... *B60W 30/18136* (2013.01); *B60T 7/042* (2013.01); *B60T 8/171* (2013.01); *B60T 8/172* (2013.01); *B60T 8/1755* (2013.01); *B60T 8/885* (2013.01); *B60T 17/22* (2013.01); *B60W 10/06* (2013.01); *B60W 10/18* (2013.01);
(Continued)

(58) Field of Classification Search
CPC ........... B60W 30/18136; B60W 10/06; B60W 10/18; B60W 50/045; B60W 2510/0638; B60W 2510/18; B60W 2520/12; B60W 2710/0644; B60W 2710/1005; B60W 2710/18; B60W 2720/12; B60T 7/042; B60T 8/171; B60T 8/172; B60T 17/22; B60T 2220/04; B60T 2260/09;
(Continued)

(56) References Cited

U.S. PATENT DOCUMENTS

| 6,293,632 B1 * | 9/2001 | Grote ...................... B60T 7/042 |
| | | 188/1.11 E |
| 6,295,490 B1 * | 9/2001 | Streib ..................... B60T 8/885 |
| | | 701/31.7 |

(Continued)

FOREIGN PATENT DOCUMENTS

| WO | WO-2008128835 A1 * | 10/2008 | ............ B60T 8/4077 |
| WO | WO-2010081840 A1 * | 7/2010 | .............. B60T 7/042 |

(Continued)

*Primary Examiner* — Tuan C To
(74) *Attorney, Agent, or Firm* — Cantor Colburn LLP

(57) ABSTRACT

A vehicle includes a fault-tolerant braking system that controls a brake assembly which is configured to adjust a braking force applied to one or more wheels. The fault-tolerant braking system further includes a brake-by-wire (BBW) system and a vehicle control module (VCM). The BBW system is configured to control the brake assembly in response to a braking request. The VCM is configured to detect a fault of at least one of the brake assembly and the BBW system. In response to detecting the fault, the VCM selectively operates the vehicle between a normal operating mode and at least one degraded driving mode that limits operation of at least one of the vehicle engine and the vehicle transmission compared to the normal operating mode.

14 Claims, 4 Drawing Sheets

(51) Int. Cl.
*B60T 8/171* (2006.01)
*B60T 8/172* (2006.01)
*B60T 17/22* (2006.01)
*B60W 10/06* (2006.01)
*B60W 10/18* (2012.01)
*B60W 50/04* (2006.01)
*B60T 8/1755* (2006.01)
*B60T 8/88* (2006.01)

(52) U.S. Cl.
CPC ........ B60W 50/045 (2013.01); *B60T 2220/04* (2013.01); *B60T 2260/04* (2013.01); *B60T 2260/09* (2013.01); *B60T 2270/402* (2013.01); *B60T 2270/404* (2013.01); *B60T 2270/82* (2013.01); *B60W 2510/0638* (2013.01); *B60W 2510/18* (2013.01); *B60W 2520/12* (2013.01); *B60W 2710/0644* (2013.01); *B60W 2710/1005* (2013.01); *B60W 2710/18* (2013.01); *B60W 2720/12* (2013.01); *B60Y 2306/13* (2013.01); *B60Y 2400/81* (2013.01)

(58) Field of Classification Search
CPC ........... B60T 2270/404; B60T 2270/82; B60Y 2306/13; B60Y 2400/81
USPC .......................................................... 701/48
See application file for complete search history.

(56) References Cited

U.S. PATENT DOCUMENTS

| | | | | |
|---|---|---|---|---|
| 6,405,117 | B1* | 6/2002 | Walenty | B60T 8/885 |
| | | | | 701/32.1 |
| 8,702,181 | B2* | 4/2014 | Drumm | B60T 8/4077 |
| | | | | 303/114.1 |
| 8,876,223 | B2* | 11/2014 | Schiel | B60T 7/042 |
| | | | | 188/152 |
| 9,592,802 | B2* | 3/2017 | Deng | B60T 7/042 |
| 9,809,210 | B2* | 11/2017 | Books | B60T 8/885 |
| 9,827,960 | B2* | 11/2017 | Feigel | B60T 8/4081 |
| 9,845,085 | B2* | 12/2017 | Besier | B60T 7/042 |
| 2003/0222497 | A1* | 12/2003 | Fey | B60T 7/06 |
| | | | | 303/113.1 |
| 2006/0074500 | A1* | 4/2006 | Naik | G05B 9/03 |
| | | | | 700/21 |
| 2006/0087173 | A1* | 4/2006 | Kajiyama | B60T 8/3655 |
| | | | | 303/3 |
| 2008/0017425 | A1* | 1/2008 | Albrichsfeld | B60T 1/10 |
| | | | | 701/70 |
| 2008/0054718 | A1* | 3/2008 | Nishino | B60T 8/1755 |
| | | | | 303/146 |
| 2008/0217122 | A1* | 9/2008 | Von Hayn | B60T 7/042 |
| | | | | 188/159 |
| 2008/0251328 | A1* | 10/2008 | Albrich Von Albrichsfeld ......... B60T 8/3275 |
| | | | | 188/159 |
| 2008/0258546 | A1* | 10/2008 | Drumm | B60T 7/042 |
| | | | | 303/115.4 |
| 2012/0102942 | A1* | 5/2012 | Sellinger | B60T 7/042 |
| | | | | 60/545 |
| 2012/0160580 | A1* | 6/2012 | Nakata | B60K 6/365 |
| | | | | 180/65.29 |
| 2013/0125638 | A1* | 5/2013 | Miyazaki | B60T 7/042 |
| | | | | 73/132 |
| 2015/0061854 | A1* | 3/2015 | Drumm | B60T 7/042 |
| | | | | 340/453 |
| 2015/0321671 | A1* | 11/2015 | Simmons | B60W 30/143 |
| | | | | 701/48 |
| 2016/0090071 | A1* | 3/2016 | Tuhro | B60T 8/172 |
| | | | | 701/70 |
| 2016/0362095 | A1* | 12/2016 | Crombez | B60T 8/885 |

FOREIGN PATENT DOCUMENTS

WO  WO-2011120962 A1 * 10/2011 ............. B60T 7/042
WO  WO-2011154369 A1 * 12/2011 ............. B60T 7/042

* cited by examiner

FAULT-TOLERANT AUTOMOTIVE BRAKING SYSTEM

FIELD OF THE INVENTION

The disclosed herein relates to vehicle braking systems and, more particularly, to a vehicle including a brake-by-wire system.

BACKGROUND

Current industrial automotive trends to reduce the number of overall mechanical components of the vehicle and to reduce the overall vehicle weight have contributed to the development of system-by-wire applications, typically referred to as X-by-wire systems. One such X-by-wire system that has recently received increased attention is a brake-by-wire (BBW) system, sometimes referred to as an electronic braking system (EBS).

Unlike conventional mechanical braking systems, BBW systems actuate one or more vehicle braking components via an electric signal that is generated by an on-board processor/controller. BBW systems typically remove any direct mechanical linkages and/or hydraulic force-transmitting-paths between the vehicle operator and the brake control units. In some systems, a BBW system supplants a conventional hydraulic fluid-based service braking system with an electrical-based system to perform basic braking functions.

Various design techniques have been implemented to promote the reliability of the BBW system including, for example, redundancy, fault tolerance to undesired events (e.g., events affecting control signals, data, hardware, software or other elements of such systems), fault monitoring, and fault recovery. One design approach to provide fault tolerance which has been utilized in BBW control systems has been to include a mechanical backup system which is separate from the BBW system and operates as an alternate means for braking the vehicle. These systems, however, add undesirable weight and packaging complexity to the vehicle.

SUMMARY

In one exemplary embodiment, a vehicle includes a fault-tolerant braking system. The fault-tolerant braking system includes an engine configured to generate drive torque, and a transmission configured to transfer the drive torque to a wheel of the vehicle. The fault-tolerant braking system further includes a brake assembly, a brake-by-wire (BBW) system and a vehicle control module (VCM). The brake assembly is coupled to the wheel, and is configured to adjust a braking force applied to the wheel. The BBW system is configured to control the brake assembly in response to a braking request. The VCM is in electrical communication with the BBW system, and is configured to detect a fault of at least one of the brake assembly and the BBW system. In response to detecting the fault, the VCM selectively operates the vehicle between a normal operating mode and at least one degraded driving mode that limits operation of at least one of the engine and the transmission compared to the normal operating mode.

In another exemplary embodiment, a fault-tolerant braking system comprises a brake assembly coupled to a wheel of the vehicle. The brake assembly is configured to adjust a braking force applied to the wheel. The fault-tolerant braking system further includes a brake-by-wire (BBW) system and a vehicle control module (VCM). The BBW system is configured to control the brake assembly in response to a braking request. The VCM is in electrical communication with the BBW system, and is configured to detect a fault of at least one of the brake assembly and the BBW system. The VCM operates the vehicle in at least one degraded driving mode that reduces output of the engine in response to detecting the fault.

In yet another exemplary embodiment, a method of controlling a vehicle including a brake-by-wire (BBW) system comprises detecting a fault of at least one of the BBW system and a brake assembly configured to control braking of a wheel. The method further includes determining a severity of the fault among a plurality of different severities, and activating a degraded driving mode among a plurality of driving modes based on the severity of the fault. Each driving mode is configured to control at least one of an engine of the vehicle and a transmission of the vehicle according to different reduced driving parameters. The method further includes limiting operation of at least one of the engine and the transmission according to the reduced driving parameters set by the activated degraded driving mode.

The above features are readily apparent from the following detailed description when taken in connection with the accompanying drawings.

BRIEF DESCRIPTION OF THE DRAWINGS

Other features and advantages appear, by way of example only, in the following detailed description of embodiments, the detailed description referring to the drawings in which.

DESCRIPTION OF THE EMBODIMENTS

Figure 1:
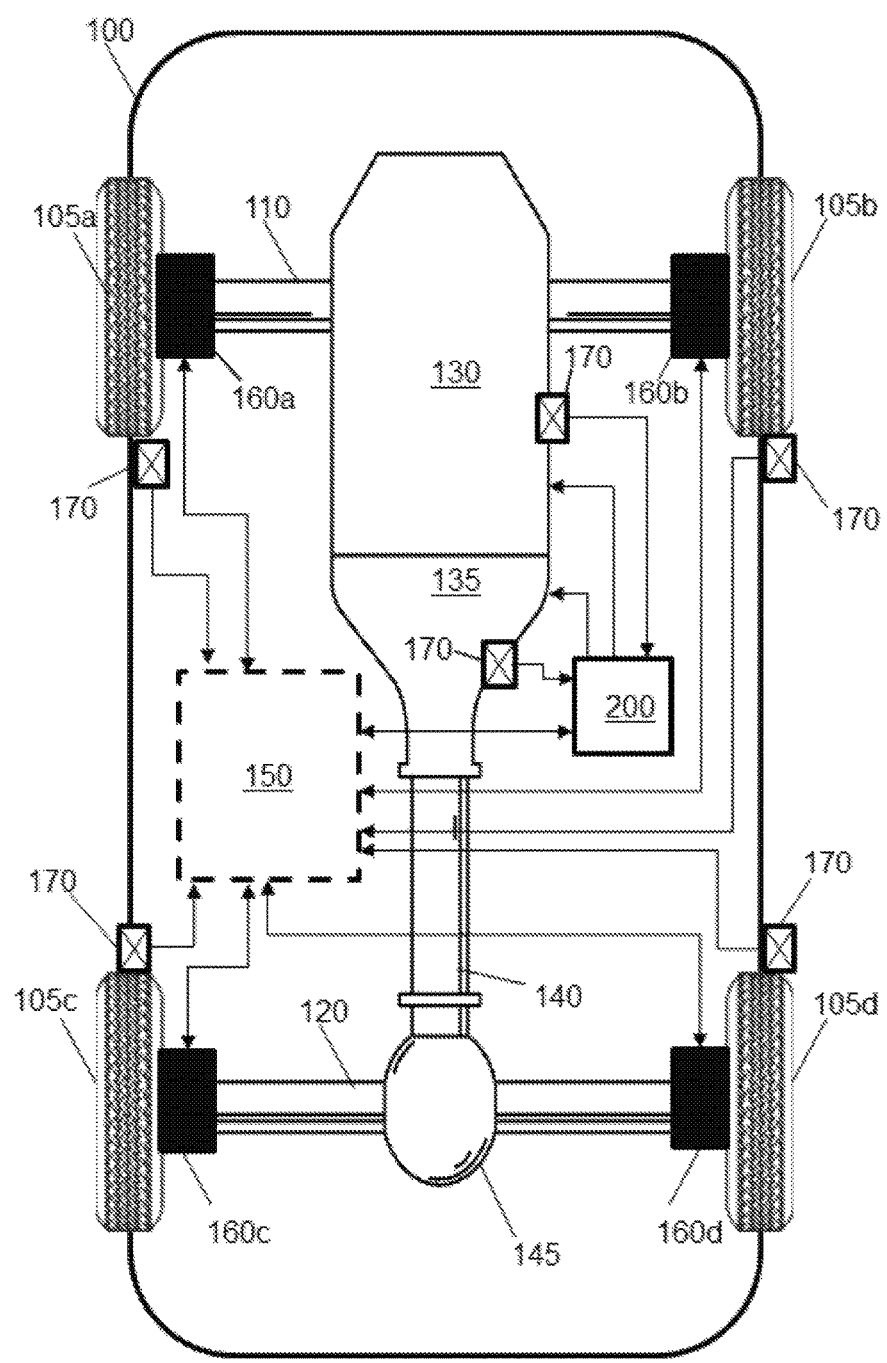
FIG. 1 illustrates a vehicle including a fault-tolerant braking system according to a non-limiting embodiment.

The following description is merely exemplary in nature and is not intended to limit the present disclosure, its application, or its uses. It should be understood that throughout the drawings, corresponding reference numerals indicate like or corresponding parts and features.

Various non-limiting embodiments described herein provide a fault-tolerant automotive braking system that implements a BBW system while excluding traditional mechanical braking back-up systems. At least one embodiment employs a fault tolerant operational state machine integrated into the vehicle level architecture to maintain normal vehicle operations and fault tolerant objectives without the need for a separate mechanical backup braking system. In this manner, overall vehicle weight and packaging complexity can be reduced while still achieving BBW system fault tolerant objectives.

In accordance with an embodiment, FIG. 1 is a top schematic view of a vehicle 100. The vehicle 100 includes a first wheel pair 105*a*-105*b*, a first axle 110, a second wheel pair 105*c*-105*d*, a second axle 120, an engine 130, a transmission 135, a driveshaft 140, a differential assembly 145, a BBW system 150, a plurality of brake assemblies 160*a*-160*d*, and a vehicle control module (VCM) 200. The VCM 200 can be employed as an electronic hardware controller including a processor and memory as understood by one of ordinary skill in the art.

The vehicle 100 may be any automobile, truck, van, sport utility vehicle, or the like. As used herein, the term vehicle is not limited to just an automobile, truck, van, or sport utility vehicle, but may also include any self-propelled or towed conveyance suitable for transporting a burden. Thus, it should be appreciated that the BBW system 150 described herein may be used with any type of vehicle.

The engine 130 may include various engine architectures including, but not limited to, a gasoline or diesel fueled internal combustion engine. The engine 130 may further be a hybrid type engine that combines an internal combustion engine with an electric motor, or can be entirely electric.

The first wheel pair 105a-105b is arranged adjacent to the engine 130 and is receives drive torque according to the mechanical operations of the transmission 135, the driveshaft 140 and the differential assembly 145 as understood by one of ordinary skill in the art. The engine 130 can also output drive torque to the second wheel pair 105c-105d via the mechanical operations of the transmission 135, the driveshaft 140, and the differential assembly 145. In this manner, the wheels 105a, 105b, 105c, 105d receive drive torque converted by the transmission 135 individually, as pairs, or in conjunction with one another.

For example, when the engine 130 is engaged with one or both wheels of the first wheel pair (105a and 105b), the vehicle 100 may be said to include a front-wheel drive configuration. When the engine 130 is engaged with one or both wheels of the second wheel pair (105d and 105c), the vehicle 100 may be said to include a rear-wheel drive configuration. When the engine 130 is simultaneously engaged with both the first wheel pair 105a-105b and the second wheel pair 105c-105d, the vehicle 100 may be said to include a four-wheel or an all-wheel drive configuration.

The transmission 135 may be configured to reduce a rotational velocity and increase a torque output of the engine 130. In an embodiment, a modified output can then be transmitted to the differential assembly 145 via the driveshaft 140. The differential assembly 145 transmits the output torque from the driveshaft 140 through a differential gear set (not shown) to the second wheel pair 105c-105d via the second axle 120. The differential gear set is arranged within the differential assembly 145.

The vehicle 100 includes the BBW system 150 (or subsystem) and at least one of the brake assemblies 160a-160d. The brake assemblies 160a-160d may be viewed as being included with the BBW system 150 such that the BBW system 150 can control braking torque to the wheels 105a, 105b, 105c, and 105d. Each of the brake assemblies 160a-160d can be a device for applying braking torque to the wheels 105a, 105b, 105c, and 105d to slow or stop a motion of the vehicle 100, such as by contact friction, magnetic operation, etc.

The BBW system 150 can include one or more components, such as electrical motors, actuators, driver interface devices, emulators, isolators, power electronics, control electronics, modules, drivers, and the brake assemblies 160a-160d. The components can be electronically coupled and located throughout the vehicle 100. The BBW system 150 is also in signal communication with one or more sensors 170. The sensors 170 can be implemented as any device that measures physical quantities and converts these physical quantities into an electrical signal (e.g., raw sensor data, such as voltage in analog form also referred to as analog sensor data).

Thus, the sensors 170 can be any device configured to detect status/condition information of mechanical machinery of the vehicle 100 and/or control electronics of the vehicle 100 and produce the analog sensor data. Examples of sensors installed in the vehicle 100 include, but are not limited to, strain gauges that measure the physical stress or force applied (e.g., fiber optic gauges, foil gauges, capacitive gauges, etc.); travel sensors that measure movement (e.g., accelerometers, gyroscopes, etc.), and temperature sensors that measure the temperature characteristics and/or the physical change in temperature (e.g., fiber optic temperature sensors, heat meters, infrared thermometers, liquid crystal thermometers, resistance thermometers, temperature strips, thermistors, thermocouples, etc.), and object detection sensors the detect and/or identify objects located in proximity of the vehicle 100.

The BBW system 150 can utilize and distribute electrical power from power electronics, such as battery sub-systems of the vehicle 100 or the BBW system 150 to the components therein. Further, the BBW system 150 can also communicate with various driver interface devices (not shown in FIG. 1) installed on the vehicle 100. The additional driver interface device may include, but are not limited to, a parking brake lever, an input button/dial/lever, steering wheel paddle shifters, etc. The driver interface devices can cause the direct application of braking torque (e.g., amount of clamping force) to the wheels 105a, 105b, 105c, and 105d, provide an electrical braking boost to mechanical and/or hydraulic braking systems, and/or support braking when there is no way to generate braking torque from the application of the brake pedal. Braking torque can also be applied in response to one or more object detection sensors (not shown) installed on the vehicle 100.

In terms of BBW systems that employ emulated braking pedal feedback, an electrical braking boost force is applied in place of conventional brake pedal forces associated with mechanical brake systems. In at least one embodiment, the electrical braking boost feature includes two modes: (i) full-boost mode, and (ii) partial-boost mode. Full-boost mode simulates the expected mechanical behavior of a traditional brake pedal when the vehicle 100 operates in a normal mode (e.g., when the BBW system 150 operates without faults). Partial-boost mode is invoked when the vehicle 100 experiences a fault event. Partial-boost mode requires a greater pedal input to achieve a requested deceleration input by the driver. Since the pedal input required to achieve the requested deceleration is significantly noticeable to the driver, the partial-boost mode assists in informing the driver that the BBW system 150 is operating in a degraded state.

In an embodiment, the plurality of brake assemblies 160a-160d can be physically and/or electrically connected by electrical conductors (e.g., wires) to the BBW system 150, and thus can be considered included therein. Each of the plurality of brake assemblies 160a-160d can be referred to as a brake corner, a brake assembly, a caliper/rotor assembly, etc. In general, a brake assembly 160a-160d can include a caliper, a rotor, a driver, motor, and an actuator, where the actuator applies a clamping force from the caliper to the rotor based on a deceleration signal, brake torque signal and/or pressure signal. Thus, each of the brake assemblies 160a-160d can be configured to selectively slow the rotation of an associated wheel 105a, 105b, 105c, or 105d.

The brake assemblies 160a-160d can be configured to respond, whether independently or in concert, to a deceleration action from the BBW system 150. For instance, by applying braking torque to the brake pedal, activating a parking brake, operating an input button or lever, etc., an operator of the vehicle 100 causes a deceleration signal to be sent from the BBW system 150 to the plurality of brake assemblies 160a-160d.

The brake pedal assembly can include force and travel sensors (not shown) to detect pedal force, pedal travel distance, and can calculate an amount of the clamping force or brake torque to apply to one or more of the wheels 105a-105d. The clamping force or brake torque can be translated by the BBW system 150 into the deceleration signal. In at least one embodiment, a plurality of force sensors and a plurality of travel sensors are included in a brake pedal assembly to employ additional fault tolerance in the vehicle 100.

A travel sensor can also be coupled to a parking brake (not shown) to detect an on-position that is translated by the BBW system 150, which in this case can indicate a predetermined clamping force that provides a full stop. The input button/dial/lever can also operate to receive an input from the operator to enable the BBW system 150 to generate, as the deceleration signal, a predetermined and/or variable clamping force. The deceleration signal causes the plurality of brake assemblies 160a-160d, whether individually or in concert, to apply a braking torque on corresponding wheels 105a-105d that result in wheel rotational deceleration.

The VCM 200 is implemented as an electronic hardware controller and can control the engine 130 and the transmission 135 based on electrical data output from one or more sensors 170. The data provided to VCM 200 by the sensors 170 includes, but is not limited to, wheel speed, ignition activation/deactivation, existing transmission gear state, transmission gear state requests, engine temperature, battery voltage, and circuit fault events. The VCM 200 can control the engine 130 and/or transmission 135 to regulate or limit vehicle operation such as, for example, limit the speed of the vehicle 100, force vehicle shut-down, prevent vehicle startup, etc. The data provided by the sensors 170 also allows the VCM 200 to determine overall vehicle system heath, status of one or more vehicle systems, and/or various environmental conditions.

The VCM 200 is also in signal communication with the BBW system 150. Accordingly, the VCM 200 may obtain brake system data including, but not limited to, diagnostic data corresponding to the brake assemblies 160a-160d, temperatures of the brake assemblies 160a-160d, and braking requests. Based on the data provided by the sensors 170 and/or the BBW system 150, the VCM 200 can command the BBW 150 to operate according to a normal operating mode, or to one or more limited operating modes as described herein. The VCM 200 can also output a vehicle status signal indicating that a limiting operating mode has been activated. The vehicle status signal can trigger one or more alerts including, but not limited to, an audio alert, an illumination, or a graphical alert displayed on the vehicle dashboard. A graphical alert may also inform the driver which particular limited driving mode is active. Although the VCM 200 is illustrated as being a separate module from the BBW system 150, it should be appreciated that the VCM 200 can be integrated within the BBW system 150. For instance, the logic and/or hardware of the VCM 200 can be implemented in a BBW controller (not shown in FIG. 1) that is included in the BBW system 150.

Figure 2:
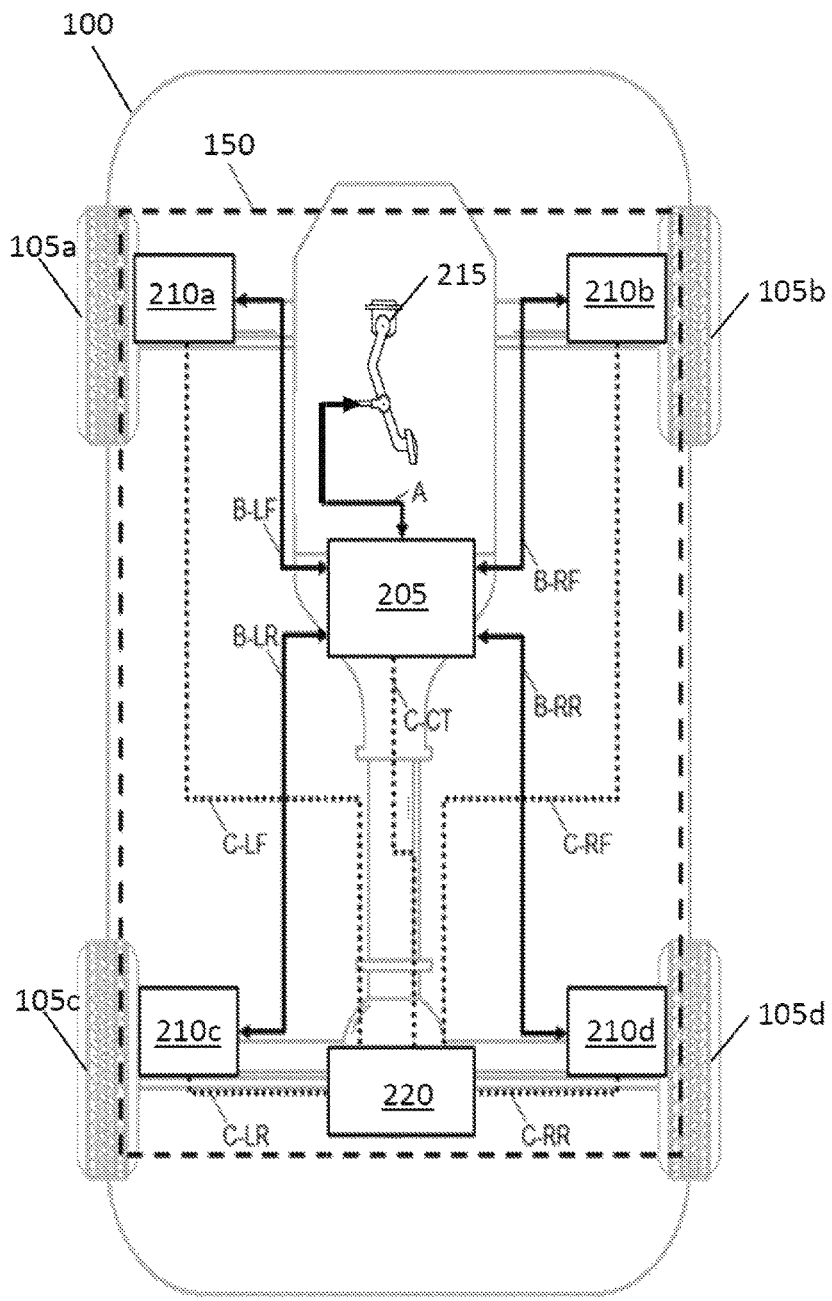
FIG. 2 illustrates a BBW system utilized by the fault-tolerant braking system illustrated in FIG. 1.

Turning now to FIG. 2, the BBW system 150 will now be described in greater detail. As illustrated, the BBW system 150 includes a BBW controller 205, brake actuators 210a-210d, a driver interface device such as, for example, a brake pedal assembly 215, and power electronics 220. The items illustrated by FIG. 2 are representations and are not intended to be limiting. Thus, each component may represent a plurality of that component and/or each plurality may represent a singular iteration thereof. It should also be appreciated that the BBW system 150 can include addition components or fewer components. The BBW system 150 may also be in communication (e.g., signal communication) with other components embodied in separate arrangements in a distributed manner, and that the components can be embodied in an integrated control scheme. The brake actuators 210a-210d can be integrated in a respective brake assembly (see FIG. 1; 160a-160d) and are aligned with and control braking at a corresponding wheel 105a-105d of the vehicle 100.

The components of the system 150 can be electronically coupled and located throughout the vehicle 100, along with being configured to communicate/interact with each other. As shown in FIG. 2, signals and power wirings are identified by various arrows and lines. The signals/communications between the BBW controller 205 and the brake pedal assembly 215 are indicated by signal arrow (A). Signals/communications between the BBW controller 205 and the brake actuators 210a-210d are indicated by the signals B-LF, B-RR, B-LR, and B-RF. The power wirings C-CT, C-LF, C-RR, C-LR, and C-RF represent the coupling of the power electronics 220 and other components. Although a single BBW controller 205 is illustrated, multiple BBW controllers 205 may be included in the BBW system 150 to provide redundancy and increased fault-tolerance.

In general, the system 150 is capable of maintaining normal braking operation and/or achieving acceptable fault tolerance through a robust implementation of multiple components and/or algorithms that receive inputs from the brake pedal assembly 215. The brake pedal assembly 215 can be an electro-mechanical device that virtualizes mechanical pedal behaviors provided by a traditional hydraulic braking system. The brake pedal assembly 215 outputs at least one braking signal (e.g., signal A) to the BBW controller 205.

The BBW controller 205 can include any processing hardware, software, or combination of hardware and software utilized by the system 150 that implements architectures to achieve fault-tolerance for the system 150. The BBW controller 205 can also store in memory a fault tolerant operational state machine to maintain normal vehicle operations and fault tolerant objectives without the need for a separate mechanical backup braking system as described herein. Although the BBW controller 205 is illustrated as a single, independent controller, it should be appreciated that the BBW controller 205 can be integrated into other controllers (e.g., such as the brake actuators 210a-210d of the BBW system 150), to reduce costs of additional hardware and/or software.

The BBW controller 205 receives a plurality of inputs, which include inputs from the brake pedal assembly 215. Further, the plurality of inputs can include engine revolutions per minute, vehicle speed, ambient temperature (e.g., in and/or outside of the vehicle), wheel speed, inertial measurements, etc. The various sensors 170 can provide the inputs described herein. The plurality of inputs can be used by the BBW controller 205 to generate commands and/or currents that drive the brake actuators 210a-210d. The commands and/or currents can be responsive to one or more of the plurality of inputs. The commands and/or currents are, in turn, braking commands by the BBW controller 205 to the brake actuators 210a-210d based on the operation of the brake pedal assembly 215.

By applying pressure to a brake pedal of the brake pedal assembly 215, an operator causes signal A to be sent to the BBW controller 205. From signal A, the BBW controller 205 can detect that a brake signal is intended by the operator and processes an amount of force and a distance moved. For instance, to detect the brake signal, the BBW controller 205 can compare the amount of force and/or the distance moved to a threshold or slope. If the brake signal is detected based on this comparison, the BBW controller 205 can generate at least one braking command to the brake actuators 210a-210d. Each braking command, in general, can correspond to a particular brake actuator 210a-210d.

Figure 3:
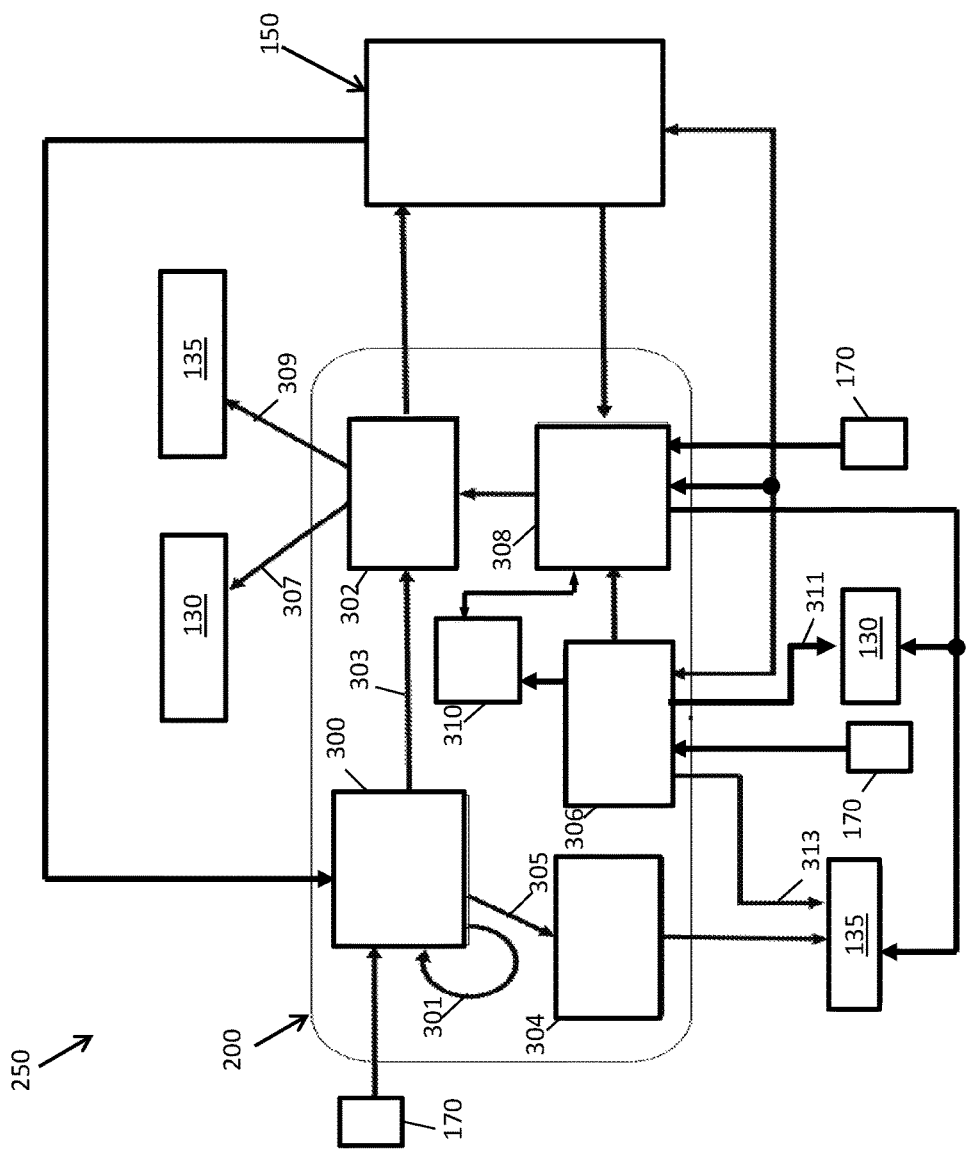
FIG. 3 is a signal flow diagram illustrating operation of the fault-tolerant braking system according to a non-limiting embodiment.

With reference now to FIG. 3, a signal flow diagram illustrates operation of a fault-tolerant braking system 250 according to a non-limiting embodiment. The fault tolerant braking system 250 includes the BBW system 150 and the VCM 200. The VCM 200 is in signal communication with the BBW system 150 which includes various sub-systems and components such as, for example, one or more BBW controllers 205, brake assemblies 160a-160d, the brake actuators 210a-210d integrated in the brake assemblies 160a-160d, the brake pedal assembly 215, and the power electronics 220 (see FIG. 2). In at least one embodiment, the various sub-systems and components are assigned a priority value. For instance, the BBW controller 205 is assigned a first priority value while the brake actuator 210a is assigned a second priority value that is less than the first priority value. The VCM 200 can utilize the different priority values to identify the severity of a detected fault. For example, the VCM 200 can determine that a faulty controller 205 is a more critical fault than a faulty brake actuator 210a.

The VCM 200 includes a start-up test module 300, an engine/transmission module 302, a service mode module 304, a degraded driving mode module 306, a vehicle shut down module 308, and a force coast-down module 310. Although not illustrated, the VCM 200 may also include memory and a microprocessor configured to execute various program instructions, state machines, and logical operations stored in the memory. It should be appreciated that FIG. 3 is just one example of the fault-tolerant braking system 250. For instance, one or more of the modules 300-310 may be integrated with the BBW controller 205 (not shown in FIG. 3) included in the BBW system 150.

The start-up test module 300 is configured to perform various initialization start-up tests at vehicle start-up (e.g., key-start or ignition on). The initialization start-up tests may include performing one or more diagnostic tests including, but not limited to, circuit fault detection tests, brake assembly diagnostic tests, brake actuator diagnostic tests, BBW system diagnostic tests, and vehicle power diagnostic tests. The data used to perform the initialization start-up tests may be provided from various sensors 170 and/or the BBW system 150. When the vehicle 100 passes the various initialization start-up tests(s), the start-up test module 300 outputs a PASS signal 303 to the engine/transmission module 302. When, however, the vehicle 100 does not pass the initialization start-up test(s), the start-up test module 300 outputs a NO_PASS signal 305 to the service mode module 304. In at least one embodiment, the test(s) can be repeated (indicated by arrow 301) until the number of failed tests exceeds a threshold value. Once exceeding the fail threshold, the NO_PASS signal 305 is output as described above.

The PASS signal 303 informs the engine/transmission module 302 that the vehicle 100 can be operated in a normal operating mode. Accordingly, the engine/transmission module 302 outputs an engine control signal 307 and a transmission control signal 309. The engine control signal 307 commands the engine 130 to operate normally upon start-up while the transmission control signal 309 commands the transmission 135 to operate according the gear selection input by a driver of the vehicle 100.

The NO_PASS signal 305, however, informs the service mode module 304 that the vehicle 100 did not pass one or more initialization start-up tests necessary to operate the vehicle 100 in the normal operating mode. In response to receiving the NO_PASS signal 305, the service mode module 304 invokes a service maintenance mode which prevents the vehicle 100 from operating in the normal driver mode. For instance, the vehicle 100 is placed in the service maintenance mode to enable a limited operation that allows limited vehicle functions. Entering the maintenance service mode can include releasing a brake, such as a parking brake, and commanding the transmission 135 to limit the gear selection (e.g., shift only to Neutral gear). In this manner, the vehicle 100 can be manually pushed, towed into a garage or service area, or moved at very low speeds for service work on other non-related vehicle issues.

In at least one embodiment, the existing system conditions are monitored against predefined parameters. For example, before and during service maintenance mode operation, the fault tolerant system 250 monitors the current status of the vehicle 100 to ensure that normal vehicle operation and the service maintenance mode are mutually exclusive while vehicle hazards are minimized. To provide this exclusive relationship, input data (transmission gear selection, specific vehicle communications, driver input, etc.) provided by the sensors 170 and/or the BBW system 150 and output data (warning messages, chimes, etc.) can be incorporated into the monitoring strategy so as to meet requirements fault-tolerance objectives. For instance, the vehicle engine 130 and/or the transmission 135 can be disabled while the service maintenance mode is active.

The fault tolerant system 250 provides a plurality of different degraded driving modes for operating the vehicle 100. Each degraded driving mode limits the driving operation of the vehicle 100 compared to the normal driving mode described above. Before and during activation of a degraded driving mode, the degraded driving mode module 306 monitors the status of the vehicle 100 to ensure that the normal driving mode and the activated degraded driving mode are mutually exclusive while surrounding hazards or non-ideal vehicle conditions are mitigated. To provide this exclusive relationship, the sensors 170 and/or BBW system 150 provide vehicle data (e.g., transmission gear selection, specific vehicle communications, driver input, etc.). In this manner, vehicle output and driving input requests can be limited to mitigate instances where the vehicle 100 is operated during hazardous driving conditions. For instance, vehicle propulsion capability may be allowed at a severely limited speed or vehicle operation can be completely disabled while a degraded driving mode is active. The memory of the VCM 200 may also store a history of the most recent degraded driving mode employed in the vehicle 100. In this manner, the VCM 200 can determine whether to force limited vehicle operation on the next key-start based on whether the fault causing the previous degraded driving mode still exists.

In at least one embodiment, the VCM 200 outputs a degraded mode status signal to the BBW system 150 indicating which degraded driving mode is active. The BBW controller 205 may then employ haptic or tactical feedback effects to inform the driver that a degraded driving mode has been activated. For instance, in response receiving a degraded mode status signal from the VCM 200, the BBW system 150 may force the brake pedal assembly 215 to pulsate when force is applied to the brake pedal 215. Other tactical feedback effects that gain the attention of the vehicle driver may also be implemented.

The vehicle shut down module 308 conducts an independent operation state assessment of the vehicle 100 by analyzing various system conditions indicated by vehicle data provided by the sensors 170 and/or the BBW system 150. The vehicle data utilized by the vehicle shut down module 308 includes, but is not limited to, battery voltage, battery capacity, wheel idle, wheel/vehicle speed, system component on/off, engine revolutions per minute, ambient temperature, inertial measurements, ignition status, transmission gear state, electronic parking brake status, etc. The system conditions are compared against various thresholds to determine if the vehicle 100 is in a non-hazardous state (e.g., the vehicle 100 is stationary). For example, the vehicle 100 can be determined to be in a non-hazardous state when the vehicle 100 is held stationary and therefore protected from motion-related hazers. Stationary conditions of the vehicle 100 can be determined based on the state of the transmission 135 and/or the state of the parking brake.

The degraded driving mode module 306 detects various vehicle faults, identifies the severity of the detected fault(s), and forces the vehicle into a degraded driving mode based on the severity of the fault(s). The severity of the faults can be prioritized from a lowest priority fault to a highest or most critical fault. For example, the severity of the vehicle faults may be categorized as: (i) an excessive operating condition (e.g., the lowest priority fault), (ii) a low-severity fault, (iii) a moderate-severity fault, (iv) a high-severity fault, and (v) a critical-severity fault (e.g., the highest priority fault). In at least one embodiment, the degraded driving mode module 306 can continuously monitor the vehicle 100 and determine whether to upgrade or downgrade the identified fault. For example, an initially detected high-severity fault can be updated to a critical-severity fault if the duration of the high-severity fault exceeds a time period threshold. Other criteria can also be used to update the identified faults.

An excessive operating condition is identified by the degraded driving mode module 306 when a vehicle subsystem or component operates above a typical operating threshold or is nearing its operating limit. For instance, a brake assembly 160a may be identified as operating under excessive conditions when the brake assembly temperature exceeds a temperature threshold value. The degraded driving mode module 306 can monitor the excessive operating condition to determine if the excessive condition is removed, or whether the excessive condition continues or becomes worse.

A low-severity fault is identified by the degraded driving mode module 306 when a component or sub-system categorized as a low-priority component experiences a single-point fault. A single-point low-priority fault may include, for example, a faulty wheel speed sensor or a faulty object detection sensor. A single-point fault may be determined when, for example, signal output from the component ceases and/or when the duration of a detected excessive operating condition exceeds a time period threshold.

A moderate-severity fault is identified by the degraded driving mode module 306 when a component or sub-system categorized as a moderate-priority component experiences a single-point fault and/or if a number of detected low-severity faults exceeds a fault threshold value. A single-point moderate-priority fault may include, but is not limited to, a faulty actuator component such as a valve, motor, or caliper, and other brake assembly components.

A high-severity fault is identified by the degraded driving mode module 306 when a component or sub-system categorized as a high-priority component experiences a single-point fault and/or if a number of detected moderate-severity faults exceeds a fault threshold value. A single-point high-priority fault may include, but is not limited to, a faulty controller such as a faulty BBW controller 205, or complete shut-down of one of the brake assemblies 160a-160d.

A critical-severity fault is identified by the degraded driving mode module 306 when a multi-point fault is detected, multiple high-severity faults are detected, and/or the duration of a high-severity fault(s) exceeds a time period threshold. A multi-point fault is determined when multiple components in the BBW system 150 simultaneously experience a fault. For example, detection of a faulty brake assembly 160a-160d and also an unrelated failure of the BBW controller 205 can be identified as a multipoint fault. determined critical-severity fault can also be identified in response to detecting abnormal operation of a component or sub-system responsible for operating multiple components in the BBW system 150. For instance, a faulty power supply or a fault in the power electronics 220 responsible for powering the various components in the brake assemblies 160a-160d and/or the BBW controller(s) 205 can result in a multi-point fault.

In at least one embodiment, the degraded driving mode module 306 can select a degraded driving mode among several different available degraded driving modes stored in the memory of the VCM 200. For example, the available degraded driving modes can include: (i) a Degraded 0 driving mode, (ii) a Degraded 1 driving mode, (iii) a Degraded 2 driving mode, (iv) a Degraded 3 driving mode, and (v) a Degraded 4 driving mode. These different degraded driving modes are described in greater detail below. A state-table is also stored in memory that maps a particular degraded driving mode to the severity of a detected vehicle fault. In this manner, the degraded driving mode module 306 is capable of selecting the appropriate degraded driving mode based on the severity of the fault(s) affecting the vehicle 100.

The Degraded 0 driving mode is activated when the degraded driving mode module 306 detects one or more excessive operating conditions. Activation of the Degraded 0 driving mode invokes various driver alerts without limiting the speed of the vehicle 100. The alerts include, but are not limited to, graphical alerts, audio alerts, dashboard illuminations, etc. In addition, minor driving limitations such as, for example, limiting brake boost to partial brake boost output, can be employed.

The Degraded 0 driving mode may be referred to as a "non-latched" driving mode because the vehicle 100 can be transitioned back into the normal driving mode when the excessive operating condition(s) are removed while the vehicle 100 is operating. For instance, the alerts and/or limited driving limitations can be automatically removed without requiring service maintenance and/or a key cycle when the excessive operating condition(s) is removed (e.g., the temperature of the brake assembly 160a-106d returns to normal operating temperatures).

The Degraded 1 driving mode is activated in response to detecting a low-severity fault. Activation of the Degraded 1 driving mode may include invoking various driver alerts without limiting the speed of the vehicle 100 as is the case when Degraded driving modes 2-4 are invoked. The alerts include, but are not limited to, graphical alerts, audio alerts, dashboard illuminations, etc. Unlike the Degraded 0 driving mode, the alerts and/or driving limitations activated in response to invoking the Degraded 1 driving mode are maintained until start-up initialization tests are passed on the next key-start, or service maintenance performed on the vehicle 100 and the fault tolerant system 250 and the system is reset by a service technician. Accordingly, the Degraded 1 driving mode (along with Degraded driving modes 2-4 described below) can be referred to as a "latched" driving mode.

The Degraded 2 driving mode is activated in response to detecting a moderate-severity fault. Various driving limitations may be employed when the Degraded 2 driving mode is active. In at least one embodiment, the Degraded 2 driving mode limits the vehicle 100 to a reduced maximum speed (e.g., a speed greater than a limp-home speed, but less than typical highway speed ratings). For example, the vehicle 100 may be limited to a maximum of 70 kilometers per hour (about 45 miles per hour) as opposed to unlimited driving speeds, or speeds capable of reaching typical highway speeds ranging from about 90 kph (about 55 mph) to about 130 kph (about 80 mph). In addition, the Degraded 2 driving mode may invoke additional driving modifications or modes such partial brake boost The Degraded 3 driving mode is activated in response to detecting a high-severity fault. A "limp-home" operation can be invoked when the Degraded 3 mode is active, which substantially limits the speed of the vehicle 100. For instance, the maximum speed of the vehicle 100 when operating in the Degraded 3 driving mode can be limited to about 15 mph (about 10 mph), which is substantially less than the maximum driving speed allowed when operating in the Degraded 2 driving mode described above. The limp-home mode can be achieved by limiting engine torque and/or by commanding the transmission 135 to operate in a low gear capable of driving the vehicle 100 at only a low speed. The Degraded 3 driving mode can also limit other driving features of the vehicle 100 such as, for example, providing brake boost w/ power conservation as opposed to invoking a partial brake boost mode. Power conservation is another feature that further limits brake pressure when the vehicle is stationary. The parking brake can also be applied instead of holding brake pressure for an extended amount of time.

The Degraded 4 driving mode is activated in response to detecting a critical-severity fault. When the Degraded 4 driving mode is active, the vehicle 100 is forced into an immobilized state (e.g., 0 kph or 0 mph). The Degraded 4 driving mode is the most intrusive driving mode available to the degraded driving mode module 306 and is therefore activated in response to faults having the highest severity priority among the various priorities.

When the severity of the fault is identified, the degraded driving mode module 306 outputs degraded driving mode signals 311 and 313 to the engine 130 and the transmission 135, respectively. The degraded driving mode signals 311 and 313 are capable of controlling the functionality and operation of the engine 130 and transmission 135 including, but not limited to, fuel injection, torque output, and transmission gear selection so as to control the speed and operation of the vehicle 100.

Although not illustrated, the degraded driving mode signals 311 and 313 can also be output to an electronic controller dedicated to controlling the operation of the engine 130 and/or transmission 135. The dedicated controller may be programmed with a driving mode operation table that cross-references engine output and transmission parameters with the different degraded driving modes. In this manner, the dedicated controller can limit the operation of the engine 130 and/or transmission 135 depending on the active degraded driving mode indicated by the driving mode signals 311 and 313.

In at least one embodiment, activation of the Degraded 4 driving mode also invokes a forced coast-down operation controlled by the coast-down module 310. The coast-down module 310 can communicate with the vehicle shut down module 308 to determine if the vehicle 100 is in a non-hazardous condition. For instance, the coast-down module 310 can obtain system conditions such as battery state of charge, battery voltage, battery capacity, wheel idle, wheel/vehicle speed, system component on/off, engine revolutions per minute, ambient temperature, inertial measurements, etc. The system conditions can be analyzed via comparisons against thresholds.

In an embodiment, the coast-down module 310 automatically applies a forced coast-down procedure when the vehicle 100 is not in a non-hazardous condition (e.g., when the vehicle is in motion) and the amount of vehicle power is less than or equal to a threshold for continued manual vehicle operation. When the vehicle 100 is not in a non-hazardous condition (e.g., is in motion), the coast-down module 310 can command the vehicle shut down module 308 to apply the electronic parking brake such that the vehicle 100 is immobilized or maintained in a stationary state. The vehicle shut down module 308 then commands the engine/transmission module 302 to disable the transmission 135 and/or engine 130 thereby immobilizing the vehicle 100. If necessary, the coast-down module 310 can command the BBW system 150 to apply a braking force to one or more wheels 105a-105d to hasten vehicle coast-down. For instance, when the speed of the vehicle 100 is greater than a speed threshold, the coast-down module 310 can command the BBW system 150 to apply a braking force to reduce the speed of the vehicle 100.

Figure 4:
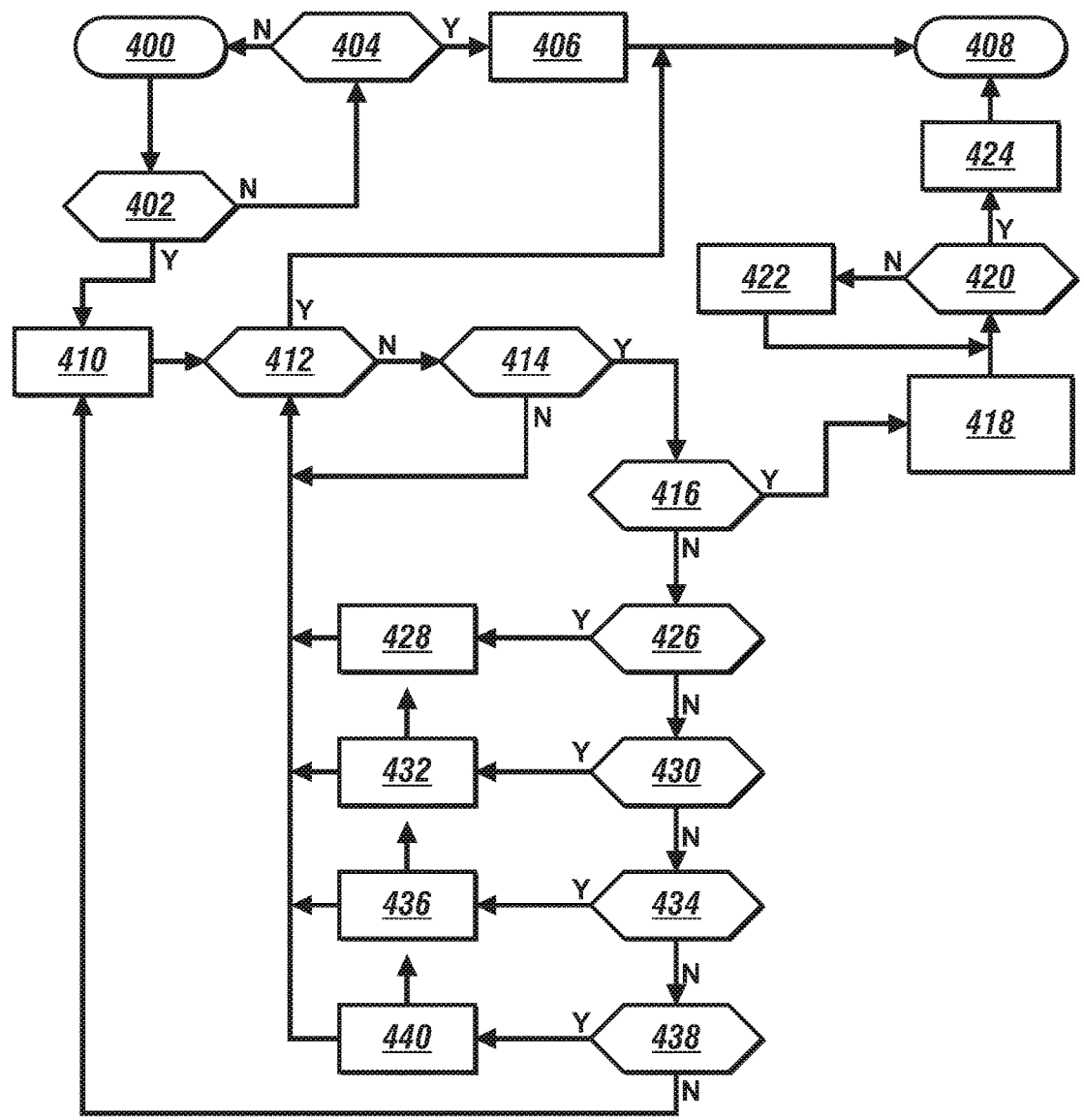
FIG. 4 is flow diagram illustrating a method of operating a fault-tolerant braking system according to a non-limiting embodiment.

Turning now to FIG. 4, a flow diagram illustrates a method of operating a fault-tolerant braking system according to a non-limiting embodiment. The method begins at operation 400, and at operation 402 an initialization start-up test is performed. The initialization start-up test may include performing one or more diagnostic tests including, circuit fault detection tests, brake actuator diagnostic tests, etc. When the initialization start-up test is not satisfied, the method proceeds to operation 404 to determine whether a maintenance-mode (e.g., garage push-mode) has been requested. When the maintenance-mode has not been requested, the method returns to operation 400 and the initialization test is repeated at operation 402. When, however, the maintenance-mode has been requested, the method invokes the maintenance mode at operation 406, and the method ends at operation 408. Accordingly, the transmission 135 of the vehicle 100 can be transitioned into the neutral (N) gear to allow the vehicle 100 to be rolled to desired location without starting the engine 130 and/or without powering the vehicle 100.

When the vehicle 100 passes the initialization start-up tests at operation 402, the vehicle 100 is allowed to operate in a normal operating mode at operation 410. In this manner, the vehicle 100 may be driven normally without invoking any of the limiting operating modes provided by the fault-tolerant braking system. At operation 412, a determination is made as to whether the vehicle 100 has been shut down or is in the process of being shut down, and whether the vehicle 100 has remained in a normal state. The vehicle 100 can be determined to be shutting down based on various parameters including, but not limited to, vehicle speed, brake pedal position, ignition state, transmission gear state, etc. When the vehicle 100 is determined to be shutting down or has been shut down, the method ends at operation 408.

When, however, the vehicle 100 has not been shut down and is still operating in the normal driving mode, the method proceeds to operation 414 and determines whether any faults exist. Various faults may be detected based on the data provided by one or more sensors 170 and/or data provided by the BBW system 150. For example, the data provided by the sensors 170 used to detect a fault includes, but is not limited to, brake assembly diagnostic information, brake actuator temperature, power supply diagnostic information, circuit fault data, etc. When a fault is not detected, the method returns to operation 412, and continues monitoring the state of the vehicle 100.

When a fault is detected at operation 414, the method proceeds to execute a series of fault identification procedures to determine the type of fault that exists, the severity of the detected fault, and/or which limited operating mode to invoke based on the severity of the fault. The series of fault identification procedures can be employed as a fault tolerant operational state machine that is integrated into the vehicle level architecture (e.g., the VCM 200) to maintain normal vehicle operations and fault tolerant objectives without the need for a separate mechanical backup braking system.

When a critical-severity fault is detected at operation 416, the method invokes a Degraded 4 driving mode at operation 418. The critical-severity fault may be determined based on various criteria. For instance, a critical-severity fault may be determined if a number of detected faults exceeds a threshold value. The critical-severity fault may also be determined based on the type of component that experiences a fault. For instance, multiple faulty BBW controllers 205, abnormal operation of multiple brake assemblies 160a-160d, or abnormal operation of a power supply 220 in the BBW system 150 may be identified as a critical-severity fault, whereas faulty operation of a wheel speed sensor may be identified as a low-severity fault. A critical-severity fault may also be determined when the duration of a high-severity fault, a moderate-severity fault and/or low-severity fault exceeds a time period threshold.

In response to invoking the Degraded 4 driving mode at operation 418, a series of operations is executed to immobilize the vehicle 100. For instance, movement of the vehicle 100 is monitored at operation 420. If the vehicle 100 is not stationary, a forced coast-down procedure is executed at operation 422. The forced coast-down procedure includes, but is not limited to, forcing the vehicle to a gradual stop, limiting the driving gear of the vehicle 100, and limiting fuel injection to the engine 130. When the vehicle becomes stationary at operation 420, the electronic parking brake is automatically applied at operation 424. After applying the electronic parking brake, the vehicle 100 is automatically shut-down at operation 408 and the method ends.

When a critical-severity fault is not initially detected at operation 416, the method proceeds to operation 426 to determine whether a high-severity fault exists. The high-severity fault is determined using data and information provided the sensors 170 and/or BBW system 150 as described herein. A high-severity fault may include, for example, a single-point fault of a high-severity component (e.g., a faulty BBW controller 205), or the detection of multiple moderate-severity faults. When the high-severity fault is detected, the method proceeds to operation 428 and a Degraded 3 driving mode is invoked. The Degraded 3 driving mode may include a limp-home operation that limits the speed of the vehicle 100. For instance, the torque produced by the engine 130 may be limited and/or the transmission 135 may be limited to operating in a low gear capable of driving the vehicle 100 at only a low speed. In addition, the Degraded 3 driving mode limits various driving features of the vehicle 100 such as, for example, vehicle stability control.

After invoking the Degraded 3 driving mode, the method returns to operation 412 and determines whether the vehicle 100 is shut-off or in the process of being shut-off. When the vehicle 100 is shut-off, the method ends at operation 408. Otherwise, the method proceeds to operation 414 and continues monitoring the faults of the vehicle 100. For instance, if the number of faults has increased, the duration of the faults has exceeded a time period threshold and/or a faulty critical component is detected at operation 416, the detected fault status can be changed from a high-severity fault to a critical-severity fault, and the method proceeds to invoke the Degraded 4 driving mode at operation 418. Otherwise, method returns to operation 428 and maintains the Degraded 3 driving mode.

When a high-severity fault is not initially detected at operation 426, the method proceeds to operation 430 and determines whether a moderate-severity fault exists. The moderate-severity fault is determined using data and information provided by the sensors 170 and/or the BBW system 150 as described herein. A moderate-severity fault may include, for example, a single-point fault of a faulty moderate-severity component (e.g., faulty brake assembly valve), or the detection of multiple low-severity faults. When the moderate-severity fault is detected, the method proceeds to operation 432 and a Degraded 2 driving mode is invoked. The Degraded 2 driving mode may include a reduced maximum speed (e.g., a speed greater than the limp-home speed, but less than typical highway speed ratings). In addition, the Degraded 2 driving mode may allow additional driving features such as full brake boost, which is limited by the Degraded 3 and Degraded 4 driving modes.

After invoking the Degraded 2 driving mode, the method returns to operation 412 and determines whether the vehicle 100 is shut-off or in the process of being shut-off. When the vehicle 100 is shut-off, the method ends at operation 408. Otherwise, the method proceeds to operation 414 and continues monitoring the faults of the vehicle 100. For instance, if the number of moderate-severity faults has increased, the duration of the faults has exceeded a time period threshold and/or a new high-severity fault or critical-severity fault is detected, the detected fault status can be changed from a moderate-severity fault to a high-severity fault or a critical-severity fault, and the method proceeds to invoke the Degraded 3 mode at operation 428 or the Degraded 4 mode at operation 418, respectively, as described above. Otherwise, method returns to operation 432 and maintains the Degraded 2 driving mode.

When a moderate-severity fault is not initially detected at operation 430, the method proceeds to operation 434 and determines whether a low-severity fault exists. The low-severity fault is determined using data and information provided the sensors 170 and/or BBW system 150 described herein. A low-severity fault may include, for example, a single-point fault of a low-severity component (e.g., wheel sensor). When the low-severity fault is detected, the method proceeds to operation 436 and invokes a Degraded 1 driving mode. The Degraded 1 driving mode may include invoking various driver alerts without limiting the speed of the vehicle 100 as is the case when Degraded driving modes 2-4 are invoked. The alerts include, but are not limited to, graphical alerts, audio alerts, dashboard illuminations, etc. In at least one embodiment, the alerts are maintained until the vehicle 100 passes start-up initialization tests on the next key-start, or service maintenance is performed on the vehicle 100 such that the alerts are removed by a service technician.

After invoking the Degraded 1 driving mode, the method returns to operation 412 and determines whether the vehicle 100 is shut-off or in the process of being shut-off. When the vehicle 100 is shut-off, the method ends at operation 408. Otherwise, the method proceeds to operation 414 and continues monitoring the faults of the vehicle 100. For instance, if the number of low-severity faults has increased, the duration of the faults has exceeded a time period threshold and/or a new moderate-severity fault, high-severity fault, and/or critical severity fault is detected, the fault status can be changed from a low-severity fault to a moderate-severity fault, high-severity fault or critical-severity fault. Accordingly, the method proceeds to invoke the Degraded 2 mode at operation 432, Degraded 3 mode at operation 428, or the Degraded 4 mode at operation 418, respectively as described above. Otherwise, method returns to operation 436 and maintains the Degraded 1 driving mode.

When a low-severity fault is not initially detected at operation 434, the method proceeds to operation 438 and determines whether an excessive operating condition exists. The excessive operating condition is determined using data and information provided the sensors 170 and/or BBW system 150 described herein. An excessive operating condition may include, for example, determining one or more vehicle components are operating in a condition nearing a fault condition. For instance, a brake assembly 160a-106d may begin experiencing excessive operating temperatures prior to being deemed faulty.

When the excessive operating condition is detected, the method proceeds to operation 440 and invokes a Degraded 0 driving mode. The Degraded 0 driving mode may include invoking various driver alerts without limiting the speed of the vehicle 100 as is the case when Degraded driving modes 2-4 are invoked. The alerts include, but are not limited to, graphical alerts, audio alerts, dashboard illuminations, etc. Minor driving limitations such as partial brake boost, for example, can also be employed in response to activating the Degraded 0 driving mode. Unlike Degraded driving modes 1-4, however, the alerts and/or driving limitations may be automatically removed without requiring vehicle restart and/or service maintenance when the excessive operating condition is removed (e.g., the temperature of the brake assembly returns to normal operating temperatures).

After invoking the Degraded 0 driving mode, the method returns to operation 412 and determines whether the vehicle 100 is shut-off or in the process of being shut-off. When the vehicle 100 is shut-off, the method ends at operation 408. Otherwise, the method proceeds to operation 414 and continues monitoring the faults of the vehicle 100. For instance, if the duration of the excessive operation condition has exceeded a time period threshold and/or a new fault is detected, the detected fault status can be changed from an excessive operating condition, to a low-severity fault, a moderate-severity fault, a high-severity fault or a critical-severity fault. Accordingly, the method proceeds to invoke the Degraded 1 mode at operation 436, Degraded 2 mode, at operation 432, Degraded 3 mode at operation 428, or the Degraded 4 mode at operation 418, respectively, as described above. Otherwise, method returns to operation 440 and maintains the Degraded 0 driving mode. If the initial excessive operating condition is removed (i.e., no longer exists) at operation 438, the vehicle is again operated in the normal driving mode at operation 410, and the method continues operating as described herein.

As described in detail above, a fault-tolerant automotive braking system is provided that implements a BBW system while excluding traditional mechanical braking back-up systems. According to at least one non-limiting embodiment, the fault-tolerant braking system includes a VCM that executes a series of fault identification procedures to determine the type of fault that exists, the severity of the detected fault, and/or which limited operating mode to invoke based on the severity of the fault. The series of fault identification procedures can be employed as a fault tolerant operational state machine that is integrated into the vehicle level architecture (e.g., the VCM 200). In this manner, the VCM controls the BBW system to maintain normal vehicle operations and fault tolerant objectives without the need for a separate mechanical backup braking system.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the disclosure has been described with reference to exemplary non-limiting embodiments, it will be understood by those skilled in the art that various changes may be made and equivalents may be substituted for elements thereof. In addition, many modifications may be made to adapt a particular situation or material to the teachings without departing from the essential scope thereof. Therefore, it is intended that the inventive teachings described herein not be limited to the particular embodiments disclosed herein.

What is claimed is:

1. A vehicle including a fault-tolerant braking system, comprising:
   an engine configured to generate drive torque;
   a transmission configured to transfer the drive torque to a wheel of the vehicle;
   a brake assembly coupled to the wheel, and configured to adjust a braking force applied to the wheel;
   a brake-by-wire (BBW) system configured to control the brake assembly in response to a braking request; and
   a vehicle control module (VCM) in electrical communication with the BBW system, the VCM configured to detect a fault of at least one of the brake assembly and the BBW system, and in response to detecting the fault selectively operates the vehicle between a normal operating mode and at least one degraded driving mode that limits operation of at least one of the engine and the transmission compared to the normal operating mode,
   wherein at least one of the brake assembly and the BBW system includes a critical-priority component, a high-priority component, a moderate-priority component, and a low-priority component, and
   wherein the VCM identifies a severity of the fault among a plurality of different fault severities, and controls at least one of the engine and the transmission to operate according to different operating parameters based on the severity of the fault, the plurality of different fault severities including a critical-severity fault, a high-severity fault, a moderate-severity fault, and a low-severity fault.

2. The vehicle of claim 1, wherein the VCM identifies a critical-severity fault in response to detecting a faulty critical-priority component, identifies a high-severity fault in response to detecting a faulty high-priority component, identifies a moderate-severity fault in response to detecting a faulty moderate-priority component, and identifies a low-severity fault in response to detecting a faulty low-priority component.

3. The vehicle of claim 2, wherein the VCM identifies a critical-severity fault when a number of faulty high-priority components exceeds a critical-fault threshold value, identifies a high-severity fault when a number of faulty moderate-priority components exceeds a high-fault threshold value, and identifies a moderate-severity fault when a number of faulty low-priority components exceeds a moderate-fault threshold value.

4. The vehicle of claim 3, wherein the plurality of different fault severities includes an excess operating condition, and wherein the VCM identifies the excess operating condition when an operating condition of at least one of the critical-priority component, the high-priority component, the moderate-priority component, and the low-priority component exceeds an operating condition threshold value.

5. The vehicle of claim 4, wherein the operating condition is a temperature value.

6. The vehicle of claim 3, wherein the VCM activates a Degrade 4 driving mode that immobilizes the vehicle in response to detecting the critical-severity fault, activates a Degraded 3 driving mode that limits the vehicle to a minimum speed limit in response to detecting the high-severity fault, and activates a Degraded 2 driving mode that limits the vehicle to a reduced maximum speed limit that is greater than minimum speed limit in response to detecting the moderate-severity fault.

7. The vehicle of claim 6, wherein immobilizing the vehicle comprises:
    analyzing, via the VCM, conditions of the vehicle system to determine whether the vehicle is in motion and to determine an amount of energy available to the vehicle; and
    automatically controlling, via the VCM, at least one of the engine and the transmission to force the vehicle to coast down when the vehicle is in motion and the amount of energy is less than or equal to a threshold for continued manual operation of the vehicle, wherein the BBW system commands the brake assembly to apply braking force to the wheel when the speed of the vehicle is greater than a speed threshold.

8. The vehicle of claim 1, wherein the VCM performs a start-up diagnostic test in response to receiving an ignition start request, and based on a result of the start-up diagnostic test, operates the vehicle in a service mode that limits startup of the vehicle.

9. The vehicle of claim 8, wherein the high-priority component includes a BBW controller configured to control the brake assembly, the moderate-priority component includes a brake actuator included with the brake assembly, and the low-priority component includes a wheel sensor included with the brake assembly.

10. A fault-tolerant braking system, comprising:
    a brake assembly coupled to a wheel of the vehicle, the brake assembly configured to adjust a braking force applied to the wheel;
    a brake-by-wire (BBW) system configured to control the brake assembly in response to a braking request; and
    a vehicle control module (VCM) in electrical communication with the BBW system, the VCM configured to detect a fault of at least one of the brake assembly and the BBW system and operates the vehicle in at least one degraded driving mode that reduces output of the engine in response to detecting the fault,
    wherein the VCM comprises:
        a degraded mode module configured to identify a severity of the fault among a plurality of different fault severities; and
        an engine/transmission module that controls at least one of the engine and the transmission to operate according to different operating parameters based on the severity of the fault, and
        wherein the degraded mode module identifies a critical-severity fault in response to detecting a faulty critical-priority component included in at least one of the brake assembly and the BBW system, identifies a high-severity fault in response to detecting a faulty high-priority component included in at least one of the brake assembly and the BBW system, identifies a moderate-severity fault in response to detecting a faulty moderate-priority component included in at least one of the brake assembly and the BBW system, and identifies a low-severity fault in response to detecting a faulty low-priority component included in at least one of the brake assembly and the BBW system.

11. The fault-tolerant braking system of claim 10, wherein the degraded mode module identifies a critical-severity fault when a number of faulty high-priority components exceeds a critical-fault threshold value, identifies a high-severity fault when a number of faulty moderate-priority components exceeds a high-fault threshold value, and identifies a moderate-severity fault when a number of faulty low-priority components exceeds a moderate-fault threshold value.

12. The fault-tolerant braking system of claim 11, wherein the high-priority component includes a BBW controller configured to control the brake assembly, the moderate-priority component includes a brake actuator included with the brake assembly, and the low-priority component includes a wheel sensor included with the brake assembly.

13. A method of controlling a vehicle including a brake-by-wire (BBW) system, the method comprising:
    detecting a fault of at least one of the BBW system and a brake assembly configured to control braking of a wheel;
    determining a severity of the fault among a plurality of different severities;
    activating a degraded driving mode among a plurality of driving modes based on the severity of the fault, each driving mode configured to control at least one of an engine of the vehicle and a transmission of the vehicle according to different reduced driving parameters; and
    limiting operation of at least one of the engine and the transmission according to the reduced driving parameters set by the activated degraded driving mode,
    wherein determining the severity of the fault further comprises:
        identifying a critical-severity fault in response to detecting a faulty critical-priority component included in at least one of the brake assembly and the BBW system;

identifying a high-severity fault in response to detecting a faulty high-priority component included in at least one of the brake assembly and the BBW system;

identifying a moderate-severity fault in response to detecting a faulty moderate-priority component included in at least one of the brake assembly and the BBW system; and identifying a low-severity fault in response to detecting a faulty low-priority component included in at least one of the brake assembly and the BBW system.

14. The method of claim 13, wherein the high-priority component includes a BBW controller configured to control the brake assembly, the moderate-priority component includes a brake actuator included with the brake assembly, and the low-priority component includes a wheel sensor.

* * * * *